United States Patent [19]

Brinkley, III

[11] Patent Number: 5,085,176
[45] Date of Patent: Feb. 4, 1992

[54] METHOD OF AND APPARATUS FOR GENERATING AND INJECTING HYDROGEN INTO AN ENGINE

[76] Inventor: William J. Brinkley, III, 605 E. Eastport St., Iuka, Miss. 38852

[21] Appl. No.: 633,932

[22] Filed: Dec. 26, 1990

[51] Int. Cl.$^5$ ............................................... F02B 43/00
[52] U.S. Cl. .................................. 123/3; 123/DIG. 12
[58] Field of Search ............................. 123/3, DIG. 12

[56] References Cited

U.S. PATENT DOCUMENTS

| | | | |
|---|---|---|---|
| 3,970,054 | 7/1976 | Henault et al. | 123/DIG. 12 |
| 4,033,133 | 7/1977 | Houseman et al. | 123/3 |
| 4,037,568 | 7/1977 | Schreiber | 123/3 |
| 4,140,090 | 2/1979 | Lindberg | 123/3 |
| 4,185,593 | 1/1980 | McClure | 123/DIG. 12 |
| 4,622,924 | 11/1986 | Lewis | 123/DIG. 12 |
| 4,702,894 | 10/1987 | Cornish | 123/DIG. 12 |

Primary Examiner—Andrew M. Dolinar
Assistant Examiner—M. Macy
Attorney, Agent, or Firm—John J. Mulrooney

[57] ABSTRACT

A hydrogen generating system produces hydrogen instantaneously upon contact of a catalyst and a reactant for simultaneous injection into the combustion chamber of an engine. The system includes an injector having an ignition chamber in communication with the combustion chamber. A catalyst is located in the ignition chamber. During the engine intake stroke, a reactant is fed into the ignition chamber where it reacts with the catalyst to produce hydrogen which is instantaneously drawn into the combustion chamber. A spark plug mounted on the injector provides a spark and the hydrogen in the ignition chamber and the combustion chamber explodes. The location of the catalyst in the injector provides for the generation of hydrogen and its immediate injection into the engine combustion chamber for use as a fuel. Automatic regeneration of the catalyst is provided by the fuel explosion, hydrogen and intense heat in the ignition chamber.

28 Claims, 3 Drawing Sheets

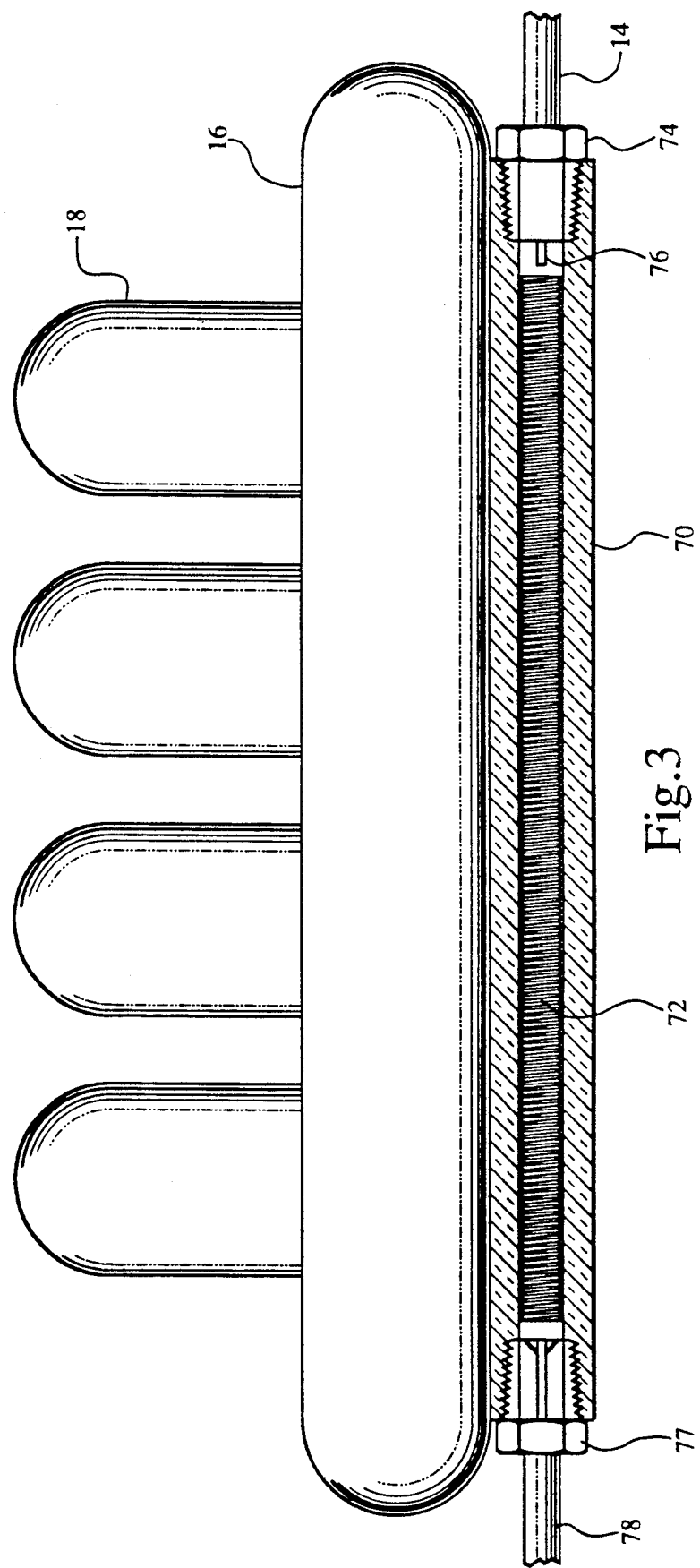

METHOD OF AND APPARATUS FOR GENERATING AND INJECTING HYDROGEN INTO AN ENGINE

FIELD OF THE INVENTION

This invention relates to a method of and apparatus for generating hydrogen for use as fuel in an engine, and, more particularly, to an on-board system for generating and simultaneously injecting hydrogen into an engine for use as fuel.

BACKGROUND OF THE INVENTION

The problems of air pollution, diminishing supply and increasing expense have prompted efforts to develop a feasible alternative fuel to hydrocarbons, i.e., gasoline, for use in all types of engines, particularly piston driven and rotary internal combustion engines, gas turbines, and stirling engines. The search for an alternative fuel to replace gasoline as the primary fuel used in engines has for some time focused on hydrogen. Hydrogen appears to be an ideal solution to the problems inherent in the use of gasoline as a fuel because hydrogen is available in water in an inexpensive and virtually inexhaustible supply, and, when hydrogen burns, the exhaust is pollution-free water vapor.

Prior efforts towards developing hydrogen fueled vehicles have involved both storage of the hydrogen gas on the vehicle and on-board generation of the hydrogen gas. While substantial efforts have been made to develop hydrogen storage systems, such storage systems are not presently practical because of the problems of hydrogen distribution to motorists and the danger posed by the storage of a substantial amount of hydrogen.

Prior efforts to develop an on-board hydrogen generation system have involved manifold hydrogen generators using steam or water on catalyst at high temperatures to generate hydrogen. The hydrogen generator unit is mounted outside the engine in heat transfer relationship with the exhaust manifold to use the heat generated by the engine in the hydrogen generation process. The hydrogen is routed through the engine carburetor and then into the combustion engine. Examples of such prior manifold hydrogen generator units are U.S. Pat. Nos. 2,295,209; 3,653,364; 4,037,568; and 4,256,060. A significant limitation on such manifold hydrogen generator units is the fact that the steam or water on catalyst process for generating hydrogen works best at temperatures in the super heated range which are usually not feasible to obtain with the amount of heat generated in exhaust manifolds. Accordingly, these manifold units are either limited by the quantity of hydrogen generated or must include supplemental heating means to provide the heat required to reach the super heated temperatures, thereby adding to the cost and decreasing the efficiency of such units. Manifold hydrogen generator units are mostly used as generators of hydrogen for use as a supplemental fuel with gasoline.

Another major problem with manifold hydrogen generator units is catalyst deactivation whereby the surface of the catalyst becomes oxidized and inoperative to generate hydrogen until it is rendered active, i.e., reactivated, by removal of the oxidation. Prior techniques for reactivating the deactivated catalyst include replacing the catalyst, e.g., U.S. Pat. No. 2,295,209 and 3,653,364; or physically removing the oxidation by brushing or other physician contact or agitation as in U.S. Pat. No. 4,256,060. It is also known, e.g., U.S. Pat. No. 4,547,356, to use hydrogen as a reducing agent to remove the oxygen from the catalyst surface and thereby regenerate or reactivate the catalyst.

In general, prior hydrogen generation units have been used to generate on-board fuel for engines, but there is a need to generate larger quantities of hydrogen more efficiently and to more effectively inject the hydrogen into the combustion chamber of the engine.

Accordingly, it is an object of this invention to provide a new and improved method of and apparatus for generating and injecting hydrogen in an engine.

It is another object of this invention to provide a new and improved method of and apparatus for generating hydrogen from water, or steam, or moist air, or hydrogen and steam, on-board a vehicle.

It is another object of this invention to provide a new and improved method of and apparatus for generating and simultaneously injecting hydrogen fuel directly into the combustion chamber of an engine.

It is another object of the present invention to provide a new and improved method of and apparatus for generating and injecting hydrogen into the combustion chamber of an engine involving a catalytic process in which deactivated catalyst is reactivated by the combustion process in the combustion chamber.

It is another object of the present invention to provide a new and improved method of and apparatus for generating hydrogen on-board a vehicle powered by an engine comprising an injector having a chamber which communicates with the compression chamber and including a catalyst from which hydrogen is generated.

SUMMARY OF THE INVENTION

In accordance with a preferred embodiment of the present invention, there is provided a hydrogen generating system including an injector mounted on the spark plug inlet of the combustion chamber of an internal combustion engine. The injector has an ignition chamber which communicates with the engine combustion chamber and which contains a catalyst, a spark plug in communication with the ignition chamber, and an inlet for feeding a reactant selected from the group consisting of hydrogen and steam, or steam, or water, or moist air, into the ignition chamber during the engine intake cycle where it reacts with the catalyst to generate hydrogen. Part of the generated hydrogen is drawn simultaneously into the combustion chamber during the intake cycle where it is immediately ready for use by the engine. A spark plug ignites the hydrogen in the ignition and combustion chambers and starts the power or expansion cycle of the engine.

The injector housing is insulated from the water cooled engine block, whereby the injector retains the maximum amount of the extraordinary heat generated by the combustion of hydrogen so that the injector and the catalyst therein are heated to super heated temperatures at which the invention operates more efficiently. At the super heated temperatures, hydrogen is generated in the injector by the dissociation of water, steam, or moist air, into hydrogen and oxygen and by the liberation of hydrogen from water, steam, or moisture by an oxidation process between the water, steam, or moisture, and the catalyst. The result is the generation of hydrogen adjacent to the combustion chamber and the simultaneous introduction of a portion of the generated hydrogen into the combustion chamber where it is immediately available and ready for use without further ducting or handling as a fuel for an engine.

Experiments indicate that the catalyst located in the injector housing is maintained in a permanent active state, i.e., it does not require a separate process or treatment to reactivate the catalyst because of a build up of oxidation thereon. It is believed that the catalyst in the injector housing actually does experience deactivation by the build up of oxidation thereon, but that the catalyst is automatically reactivated by the removal of such oxidation during each four cycle process of the engine by the intense heat and explosion and hydrogen to which the injector catalyst is exposed during the power cycle. In any event, by practice of the invention, the injector catalyst is not subject to any long term deactivation which noticeably impairs its hydrogen generating capacity.

A source of the reactant, which may be a manifold hydrogen generating unit which operates on a water or steam on catalyst principle, supplies hydrogen and steam, or steam, or water, or moist air through a steel ball check valve into the injector housing.

In general, the catalyst of the system is metallic and comprises metals which are known to be useful to generate hydrogen instanteously upon contact with a reactant. The catalyst is selected from the group consisting of iron, nickel, iron-nickel, copper, silver, platinum, palladium, molybdenum and manganese.

The exhaust product of the use of hydrogen as a fuel will be hydrogen and oxygen and water vapor, which may be recycled and further used as the source of the reactant which is fed into the injector.

Moreover, the injector body may be constructed of a catalyst material whereby the inside surface of the injector ignition chamber throughout the length of the injector body itself functions as a catalyst for the generation of hydrogen gas for fuel.

BRIEF DESCRIPTION OF THE DRAWINGS

FIG. 3 is a front elevational view, partially broken away, showing a manifold mounted auxiliary hydrogen generating unit for use in conjunction with the hydrogen generator-injector unit of the present invention to provide a source of reactant of steam and/or hydrogen and steam.

DESCRIPTION OF THE PREFERRED EMBODIMENT

Figure 1:
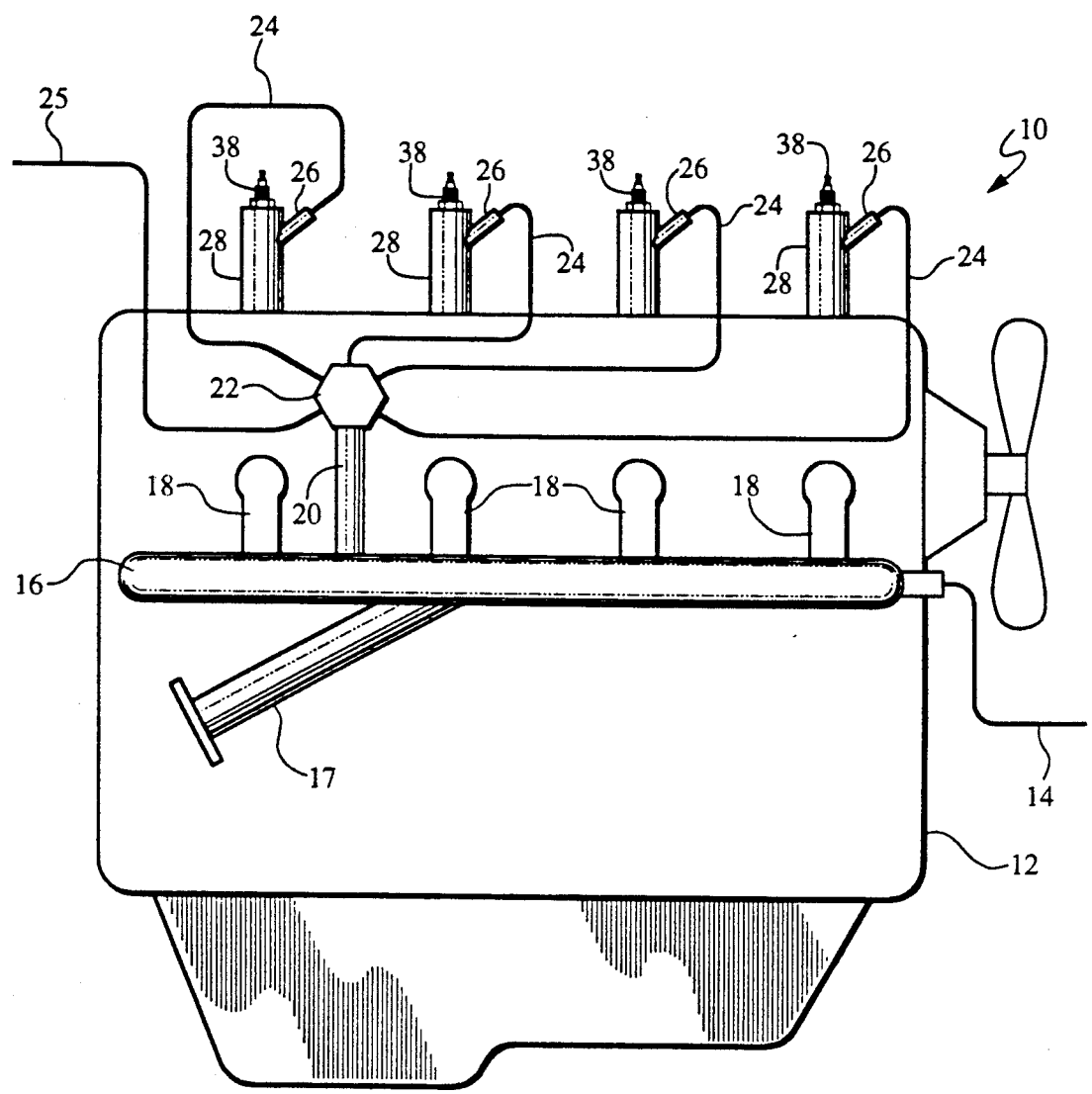
FIG. 1 is a side elevational view of an internal combustion engine with the hydrogen generator-injector apparatus of the present invention mounted thereon.

Referring to the drawings, in FIG. 1, there is shown a preferred embodiment of the invention in association with a conventional, four cylinder internal combustion engine indicated generally at 10. The engine has a water cooled engine block 12, and a cast iron exhaust manifold 16 having an exhaust pipe 17 and exhaust headers 18, all as well known and usually found on a convention four cylinder internal combustion engine. A water inlet 14 is connected to manifold 16 as hereinafter described.

An upwardly projecting manifold stem 20 extends from the manifold 16 to a hydrogen manifold 22, from which a plurality of hydrogen supply lines 24 extend to the hydrogen and steam injector inlets 26 of each of the hydrogen generator-injector units 28. Another line 25 is connected to the hydrogen manifold 22 for the purpose of checking pressures and temperatures in manifold 22.

Figure 2:
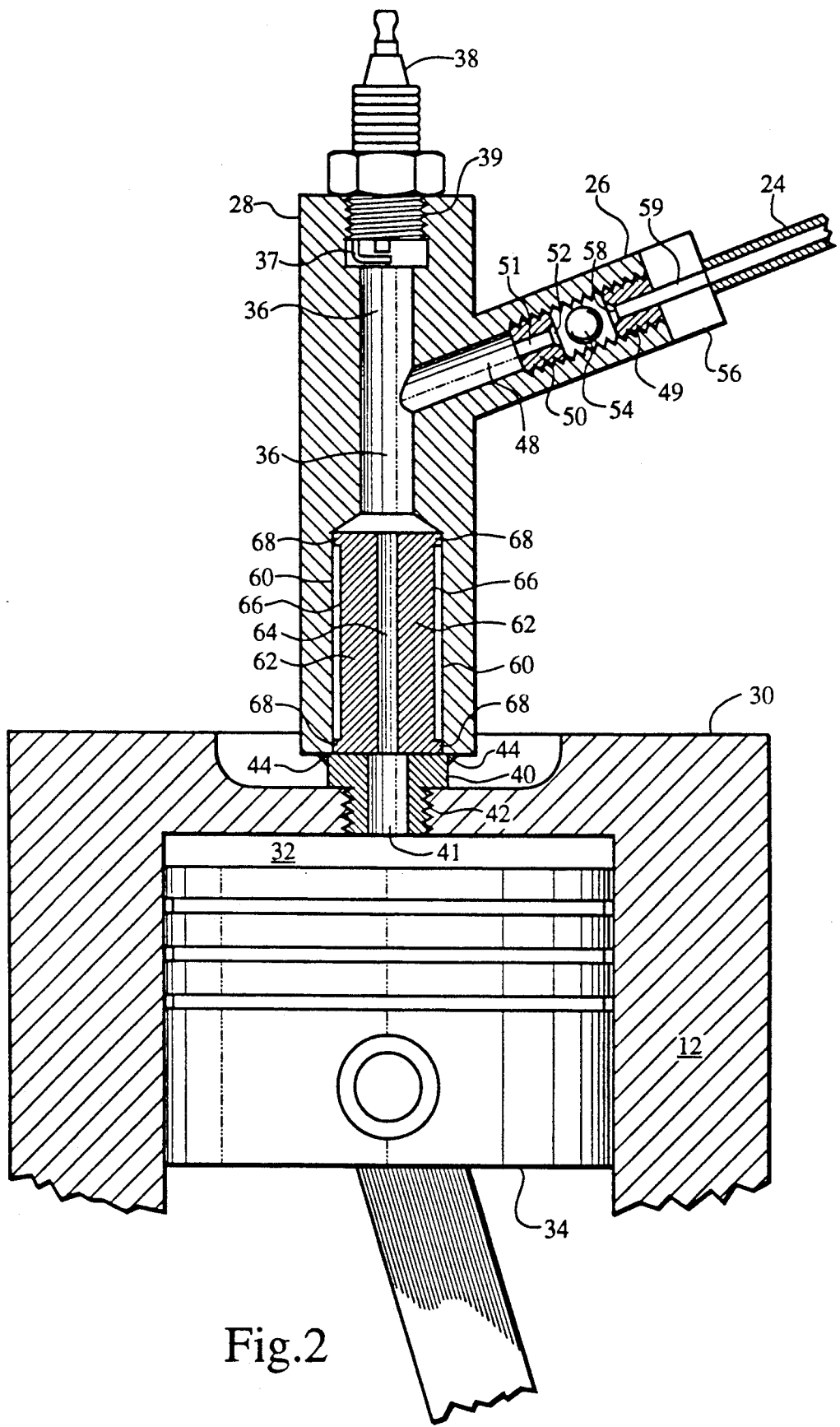
FIG. 2 is a front elevational view, partially broken away, showing the hydrogen generator-injector mounted on the cylinder head of the engine.

Referring to FIG. 2, the details of the construction of one of the hydrogen generator-injector units 28 is illustrated, along with the connection of the unit to the cylinder head 30 associated with one of the combustion chambers 32 which contains a conventional reciprocating piston 34. The conventional inlet and exhaust valves on the engine 10 are not shown.

The injector housing 28 is formed of a solid piece of metal with a cylindrical bore therethrough which forms an ignition chamber 36 extending the length of the housing. A spark plug 38 is screwed into the upper end of the injector housing 28, which is threaded at 39, so that the spark plug tip 37 communicates with the ignition chamber 36. The lower end of injector 28 has a threaded base 40 which is sized to screw into the standard, threaded spark plug inlet 42 of the cylinder head 30. The threaded injector base 40 is welded to the main injector housing 28 as indicated at 44 to provide an airtight fit and prevent the escape of gases.

The main injector housing 28 has a reactant inlet port 26 for the introduction of the reactant at an elevated temperature into ignition chamber 36. FIGS. 1 and 2 show the inlet ports 26 to be connected through hydrogen manifold 22 to a reactant source comprising a manifold hydrogen generation unit (FIG. 3) as hereinafter described. However, it will be apparent that any suitable source of a reactant could be used.

The inlet port 26 has a central bore 48 therethrough which is threaded at 49. A threaded steel hydrogen jet 50 is screwed into inlet bore 48. The threaded hydrogen jet 50 has a bore 51 therein which communicates with the inlet bore 48, and a ball check 52. The design of ball check 52 and a steel ball 54 is such that the flow of reactant through inlet port 26 into inlet bore 48 and ignition chamber 36 is permitted when the steel ball 54 is seated on ball check 52. A brass inlet fitting 56 having a seat 58 for the ball 54 is screwed into the threaded inlet bore 48. The brass inlet fitting 56 has a longitudinal bore 59 therethrough which permits for the passage of reactant from the supply lines 24 to inlet bore 48. When the ball 54 is seated against seat 58, as hereinafter described, an airtight seal is provided between the ball 54 and the seat 58.

Extending upwardly from the lower end of the injector housing 28 is a cylindrical, longitudinal bore 60 which is concentric with the bore 36 which defines the ignition chamber. A catalyst 62 in the form of a cylindrical piece of metal is positioned in the bore 60 and itself has a central bore 64 which is concentric to and aligned with the bore 36 which forms the ignition chamber and the bore 41 which passes through the threaded injector base 40. The catalyst 62 is sized to have a circumference slightly less than the circumference of the bore 60 whereby an insulating air gap 66 and insulating means 68, which may be small projections at either end of the catalyst 62 or a continuous insulation ring, contacts the walls of bore 60 and maintains the catalyst 62 in spaced apart relation to the adjacent sides of ignition chamber 36.

In a preferred embodiment of the hydrogen generator-injector, the main injector housing 28 is formed of solid piece of cold-rolled steel having dimensions of approximately 5 inches long and an O.D. of ⅝ of an inch. The longitudinal bore 36 which forms the injector ignition chamber is drilled on center to a 5/16 inch diameter. The bore 48 through inlet port 26 is a ¼ inch diameter. The insulating air gap 66 which surrounds the catalyst 62 is 1/16 inch. The longitudinal movement of the ball 54 is between 1/16 inch and 3/32 of an inch. The catalyst 62 is formed of a solid, cylindrical piece of cold-rolled steel having a length of approximately 1 and 3/8 inches, an O.D. of 5/8 inch and I.D. of 3/16 inch. The injector housing 28 and the catalyst 62 are made from the same material. Alternatively, the injection chamber and the catalyst may be made of the same material.

Referring to FIG. 3, there is illustrated one possible embodiment of the source of the reactant which is supplied to the injector 28 through inlet port 26. A manifold hydrogen generator unit comprising a catalyst chamber 70 is mounted in heat transfer relationship to the cast iron exhaust manifold 16 by mounting means which are well known and not illustrated. Alternatively, particularly in engines which have a longitudinal bore in the exhaust manifold, the catalyst chamber 70 may be formed inside of the exhaust manifold 16. The catalyst chamber 70 houses an auxiliary catalyst 72 which is formed of a threaded rod which is sized for a tight slip fit throughout catalyst chamber 70. The purpose of the screw thread on the auxiliary catalyst 72 is to increase the surface area of the catalyst for the steam to contact as it proceeds through catalyst chamber 70. As is well known, increasing the surface area of contact between the steam and the catalyst increases the hydrogen generation. A source of water, which may be preheated, is fed to water inlet 14, passes through water inlet fittings 74 and to water jet 76 from which the water emerges in the form of a fine, misty spray. The water passes along the heated catalyst chamber 70 where it is heated to make steam which contacts the auxiliary catalyst 72 to generate hydrogen through a reduction process well known to those skilled in the art. A mixture of hydrogen gas and steam passes through outlet fittings 77 to a hydrogen and steam outlet 78. In the embodiment shown in FIG. 3, the hydrogen and steam passing through outlet 78 is ducted to the manifold 22 from which it passes to the injectors 28 via hydrogen lines 24.

In an engine with an exhaust manifold having a longitudinal bore therein which is useful for the catalyst chamber 70, the hydrogen and steam generated in the catalyst chamber 70 may be removed via a manifold stem 20 as shown in FIG. 1. Of course, the hydrogen and steam or other reactant which is fed into the injector 28 may be provided by other sources of reactants as is well known to those skilled in the art.

In the illustrated, preferred embodiment of the invention, the catalyst is formed of a piece of solid, cold-rolled steel having the disclosed dimensions. The injector housing 28 also is formed of a piece of solid, cold-rolled steel having the dimensions disclosed. However, it is contemplated that other known catalysts will be used in this new and improved method of and apparatus for generating hydrogen for use as fuel in engines. The catalyst will be selected from the group consisting of iron, iron-nickel, nickel, copper, silver, palladium, platinum, molybdenum and manganese.

In the operation of the invention, the reactant generated by a suitable source is fed to the inlet port 26 during the intake-injection stroke whereby the ball 54 will be seated on ball check 52 to allow the reactant to pass through bore 51 and inlet bore 48 into the ignition chamber 36. The temperature of the catalyst 62 and the injector housing 28 surrounding the catalyst 62 will be in the super heated range whereby hydrogen will be generated by the contact of the injected reactant with the catalyst 62 and housing 28, and instantly drawn into the combustion chamber 32 during the intake stroke. During the compression stroke, when the pressure in the combustion chamber 32 and ignition chamber 36 which communicates therewith builds up, the ball 54 will be pressed tightly against the seat 58 to prevent the escape of any gases out of inlet port 26. At the proper time, the spark plug 38 provides an igniting spark which initiates the explosion and subsequent expansion stroke. The ignition chamber 36 along with the combustion chamber 32, including the catalyst 62, is subjected to the explosion. Based on observations and experiments, it is believed that the catalyst 62 does not retain any observable residual deactivation following the normal four stroke cycle of the engine, because experimental units have been operated without the loss of efficiency and generating capacity of the catalyst as is normally found in a catalyst which is part an oxidation process for the generation of hydrogen. It is believed that the effect of the intense temperatures and explosion, and possibly hydrogen, in the ignition chamber 36 and combustion chamber 32, to which the catalyst 62 is exposed, functions to deoxidize or reduce, any oxidation build up on the catalyst 62 which would manifest itself by a loss of efficiency and decrease in hydrogen generating capacity. The operating temperature of the catalyst 62 is in the range of about 850° F. to about 1600° F. As the hydrogen is ignited and burned it produces an extraordinary quantity of heat which is immediately available to heat the catalyst 62 and injector 28 to the superheated temperatures at which the reactant-on-catalyst process for the generation of hydrogen works most efficiently. Operation of the hydrogen generator-injector 28 causes the catalyst 62 and combustion chamber 32 to become progressively heated which provides the heat needed to cause both the dissociation of water and steam to hydrogen and oxygen and the generation of hydrogen by oxidation of the catalyst 62. Thus, the heat generated during operation causes the generator-injector 28 to become highly efficient in operation.

An auxiliary heating source or liquid or gaseous fuels including hydrogen, gasoline, diesel, or alcohol may be used to start and bring the apparatus and its components up to the operating temperatures in the range of from about 850° F. to about 1600° F.

What is claimed is:

1. A method of generating and injecting hydrogen into the combustion chamber of an engine comprising:
   providing an ignition chamber in communication with the combustion chamber of an engine;
   placing a catalyst in said ignition chamber;
   heating said catalyst;
   feeding a reactant into said ignition chamber for reaction with said catalyst to generate hydrogen in said ignition chamber;
   drawing a portion of said hydrogen from said ignition chamber into said combustion chamber;
   igniting said hydrogen to cause an explosion and burning of said hydrogen in said ignition chamber and said combustion chamber; and
   exposing said catalyst to said hydrogen explosion.

2. The method according to claim 1 wherein said reactant is selected from the group consisting of steam, hydrogen and steam, water and moist air.

3. The method according to claim 1 wherein hydrogen is generated in said ignition chamber by reaction of said reactant with said catalyst and by dissociation of said reactant caused by heat.

4. The method according to claim 1 wherein said catalyst is selected from the group consisting of iron, iron-nickel, nickel, copper, silver, palladium, platinum, molybdenum and manganese.

5. The method according to claim 1 wherein said catalyst is heated to a temperature of about 850° F. to about 1600° F. for the generation of hydrogen.

6. The method according to claim 1 wherein said reactant fed into said ignition chamber is elevated to a temperature of about 850° F. to about 1600° F. for the generation of hydrogen.

7. The method according to claim 1 wherein the engine is selected from the group consisting of the piston driven internal combustion engine, the rotary driven internal combustion engine, the gas turbine and the stirling engine.

8. The method according to claim 1 further comprising the step of;
heating the ignition chamber to a temperature of about 850° F. to about 1600° F. for the generation of hydrogen.

9. Apparatus for generating and injecting hydrogen into the combustion chamber of an engine comprising:
an injector having an ignition chamber in communication with the combustion chamber of an engine:
a catalyst mounted in said ignition chamber;
means for heating said catalyst;
a source of reactant connected to said ignition chamber wherein said catalyst reacts with said reactant entering said ignition chamber to generate hydrogen; and
a spark plug for producing a spark in said ignition chamber to cause explosion and burning of said hydrogen in said ignition chamber and said combustion chamber.

10. The apparatus according to of claim 9 wherein said reactant is selected from the group consisting of steam, hydrogen and steam, water and moist air.

11. The apparatus according to claim 9 wherein the hydrogen is generated by the reaction of said reactant with said catalyst and by the dissociation of said reactant caused by heat.

12. The apparatus according to claim 9 wherein said reactant is introduced into said ignition chamber during the intake stroke of said engine and a portion of the hydrogen generated by reaction of said catalyst and said reactant is drawn into said combustion chamber.

13. The apparatus according to claim 9 wherein said catalyst is heated to a temperature of about 850° F. to about 1600° F. for the generation of hydrogen.

14. The apparatus according to claim 9 wherein said catalyst is selected from the group consisting of iron, iron-nickel, nickel, copper, silver, palladium, platinum, molybdenum and manganese.

15. The apparatus according to claim 9 wherein the engine is selected from the group consisting of the piston driven internal combustion engine, the rotary driven internal combustion engine, and gas turbine, and the stirling engine.

16. A hydrogen generator-injector for use with an engine having a combustion chamber comprising;
a housing having a central bore therethrough forming an ignition chamber;
a spark plug mounted at one end of said bore to produce a spark in said ignition chamber;
a catalyst mounted in said ignition chamber;
an inlet port on said housing for feeding a reactant into said ignition chamber for contact with said catalyst to generate hydrogen;
means attached to the other end of said bore for connecting said housing to the combustion chamber of an engine whereby said ignition chamber communicates with said combustion chamber.

17. The hydrogen generator-injector according to claim 16 further comprising:
means for heating said catalyst.

18. The hydrogen generator-injector according to claim 16 wherein said catalyst is selected from the group consisting of iron, nickel, copper, silver, palladium, platinum, molybdenum and manganese.

19. The hydrogen generator-injector according to claim 16 wherein said engine is selected from the group consisting of the piston driven internal combustion engine, the rotary driven combustion engine, the gas turbine, and the stirling engine.

20. The hydrogen generator-injector according to claim 16 further comprising:
a ball valve positioned in said inlet port whereby reactant is permitted to pass through said inlet port and into said ignition chamber during the intake cycle of said engine and gas pressure within said ignition chamber and said compression chamber during the compression and explosion cycles of said engine causes said ball valve to close to prevent passage of fluids and gases through said inlet port.

21. The hydrogen generator-injector according to claim 16 wherein said reactant is injected into said ignition chamber during the intake cycle of said engine and a portion of said hydrogen generated by reaction of said reactant and said catalyst is simultaneously drawn into said combustion chamber.

22. The method according to claim 1 wherein said injector chamber and said catalyst are made from the same material.

23. The apparatus according to claim 9 wherein said injector and said catalyst are made from the same material.

24. The hydrogen generator-injector according to claim 16 said housing and said catalyst are made from the same material.

25. The method according to claim 1 wherein said reactant is supplied by a manifold hydrogen generator unit operatively associated with the exhaust manifold of said engine.

26. The apparatus according to claim 9 wherein said source of reactant is a manifold hydrogen generator unit operatively associated with the exhaust manifold of said engine.

27. The hydrogen generator-injector according to claim 16 wherein the reactant fed to said inlet port is supplied by a manifold hydrogen generator unit operatively associated with the exhaust manifold of said engine.

28. The hydrogen generator-injector according to claim 16 wherein said reactant is selected from the group consisting of steam, hydrogen and steam, water and moist air.

* * * * *